United States Patent [19]
Bernosky

[11] Patent Number: 5,474,274
[45] Date of Patent: Dec. 12, 1995

[54] COUPLING AND LOAD SUPPORT FOR SUSPENDING A LOAD FROM THE HEAD OF A COAL MINE ROOF BOLT

[76] Inventor: John Bernosky, R.D. 1, Box 341, Mt. Morris, Pa. 15349

[21] Appl. No.: 139,722

[22] Filed: Oct. 22, 1993

[51] Int. Cl.[6] .................................................. A47H 1/10
[52] U.S. Cl. ..................... 248/317; 248/58; 405/259.1; 411/383; 411/400
[58] Field of Search ................................ 248/317, 58, 59, 248/61, 62; 403/343; 411/383, 384, 304, 400; 405/259.1, 259.2, 259.3, 259.4, 259.5, 259.6

[56] References Cited

U.S. PATENT DOCUMENTS

| | | | |
|---|---|---|---|
| 2,059,825 | 11/1936 | Talbott | 248/61 |
| 2,851,239 | 9/1958 | Truax | 248/58 X |
| 2,854,824 | 10/1958 | Curry et al. | 248/58 |
| 2,862,368 | 12/1958 | Dempsey | 248/58 X |
| 2,891,752 | 6/1959 | Genter | 248/58 X |
| 3,785,598 | 1/1974 | Gillstrap | 248/317 X |
| 4,255,070 | 3/1981 | Calhohn | 248/317 X |
| 4,293,243 | 10/1981 | Graybeal et al. | 405/259.1 |
| 4,334,803 | 6/1982 | Westlake et al. | 405/259.1 |
| 4,958,796 | 9/1990 | Bernosky | 248/317 |
| 5,064,324 | 11/1991 | Ragaller | 411/304 X |

*Primary Examiner*—Ramon O. Ramirez
*Attorney, Agent, or Firm*—Robert T. Crawford

[57] ABSTRACT

A coupling and load support for suspending or hanging a load from the head of a coal mine roof bolt wherein the coupling takes the form of a thin-walled, open-ended, substantially square-shaped housing or receptacle which is structured so that the upper portion thereof can be rigidly attached to the head of the roof bolt by one or more bolts threadedly carried in the housing and is also structured so that the lower portion thereof can carry or be connected to a load support. A load of various types can be carried by the load support and the load can thereby be suspended from the head of the roof bolt.

22 Claims, 3 Drawing Sheets

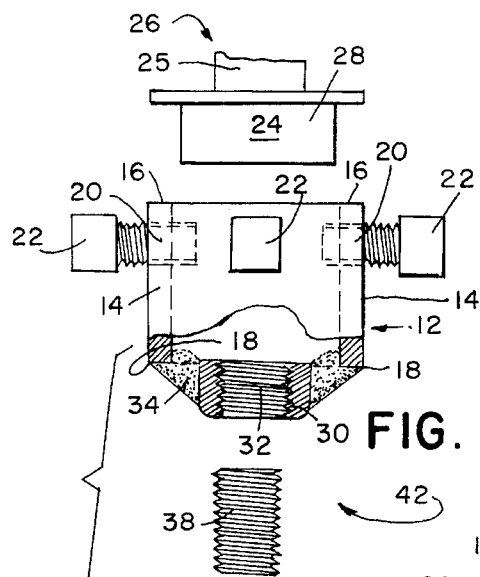
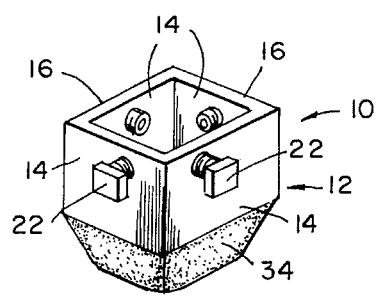
FIG. 2
FIG. 1
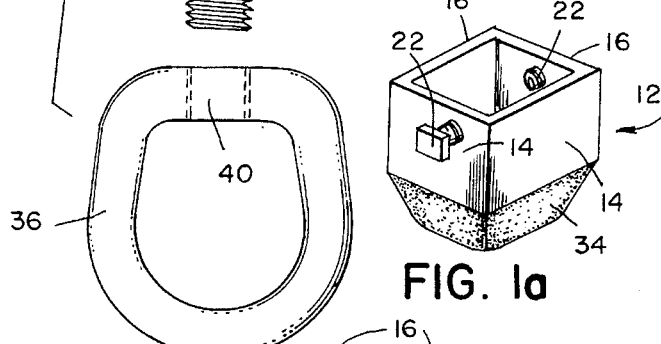
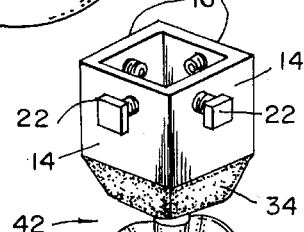
FIG. 1a
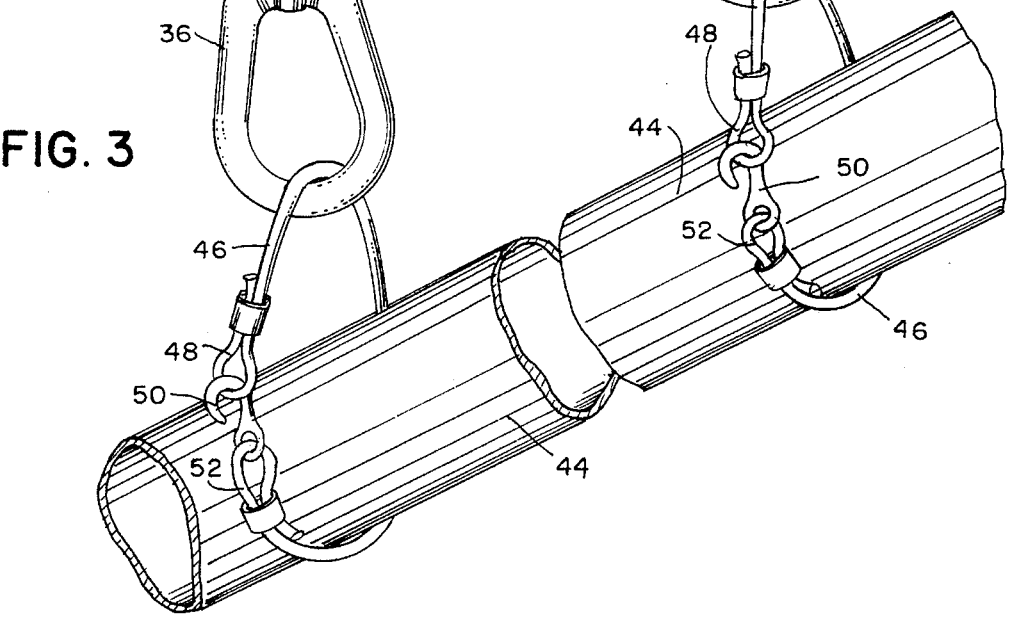
FIG. 3

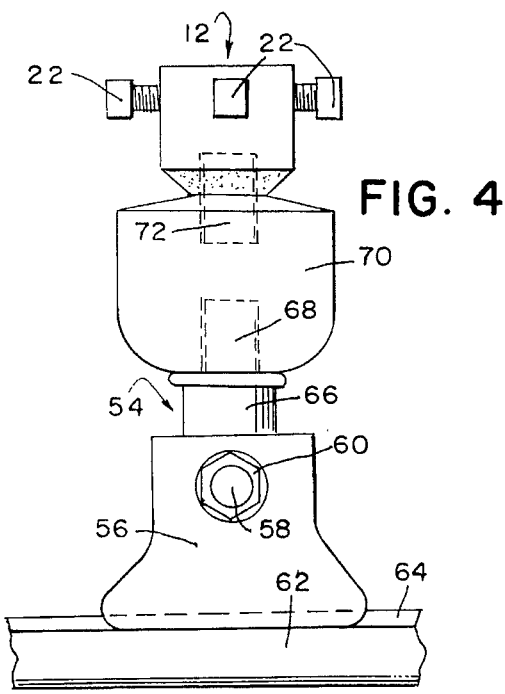
FIG. 4
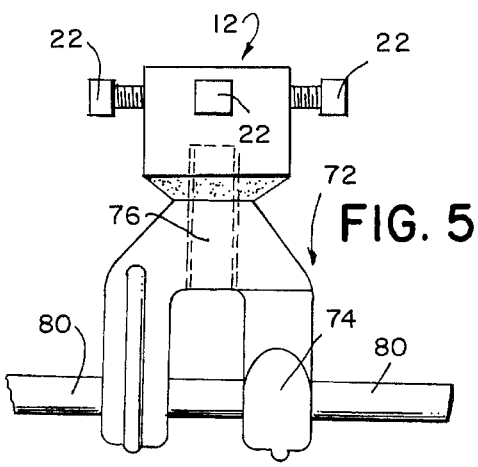
FIG. 5
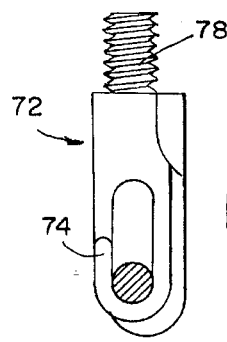
FIG. 5a
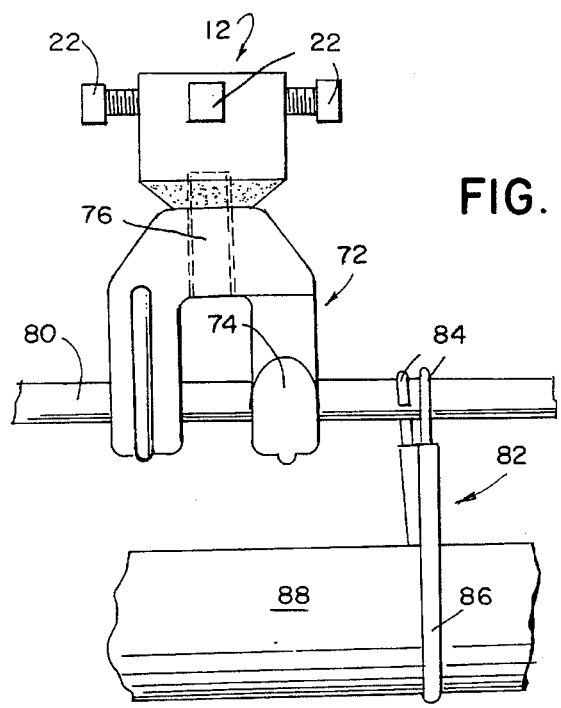
FIG. 6
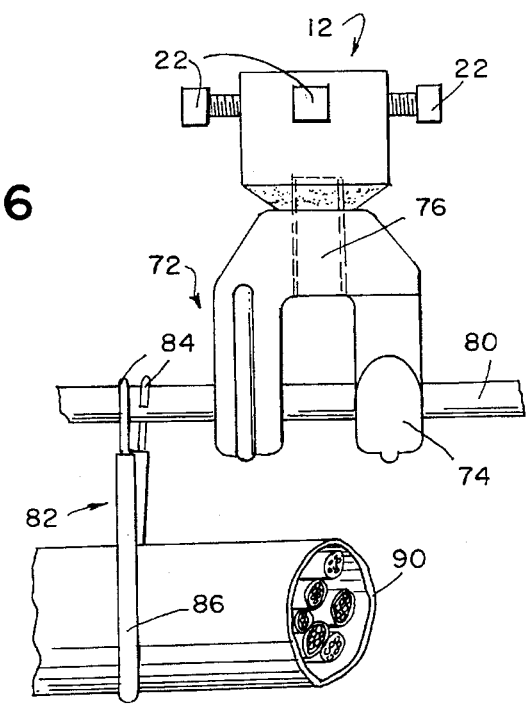

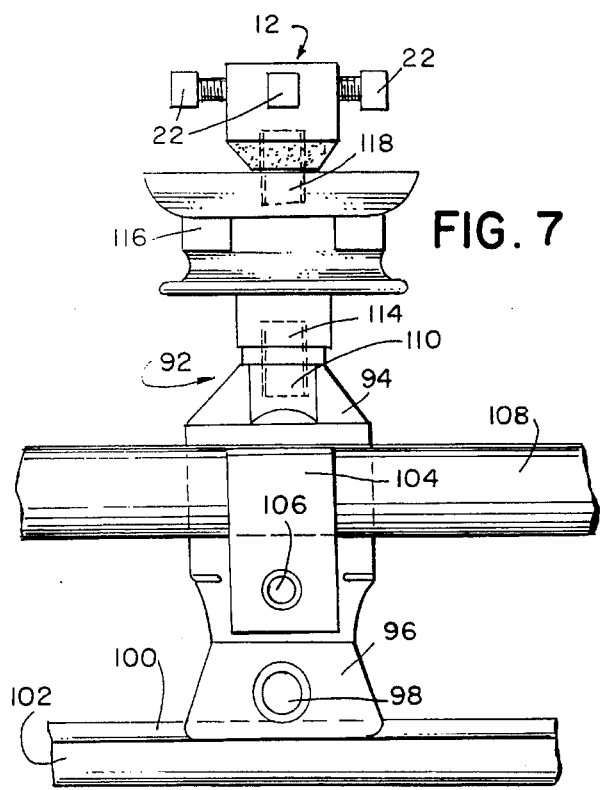
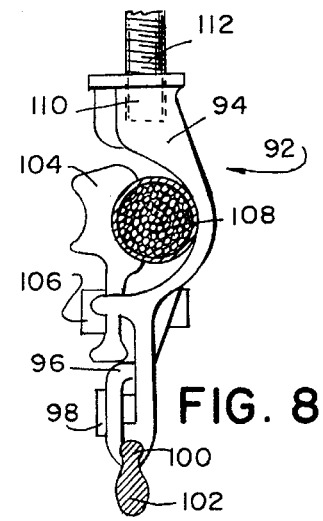
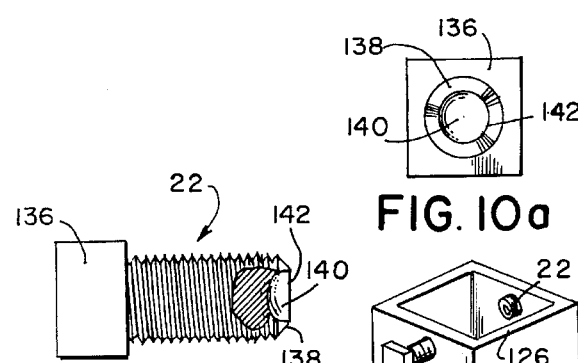
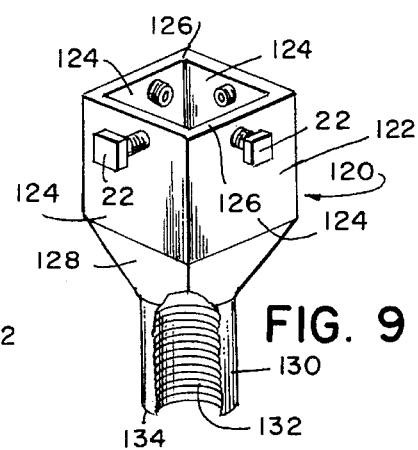
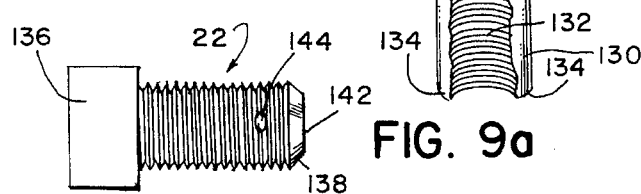
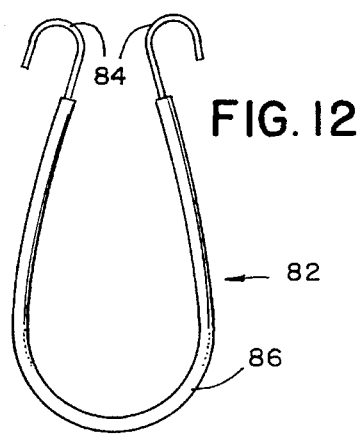

COUPLING AND LOAD SUPPORT FOR SUSPENDING A LOAD FROM THE HEAD OF A COAL MINE ROOF BOLT

FIELD OF THE INVENTION

This invention relates to an overhead support and, more particularly, to a coupling and load support for suspending or hanging a load from the head of a coal mine roof bolt. The coupling takes the form of a hollow, open-ended, thin-walled, substantially squared-shaped housing or receptacle which is rigidly connected to the head of a coal mine roof bolt by one or more bolts. The housing is also structured whereby a load support can be connected thereto. With the load support connected to the housing, a load can be applied to or carried by the support and the load can thereby be suspended or hung from the head of the roof bolt.

BACKGROUND OF THE INVENTION

Coal mine roof bolts are used in vast numbers in the mining industry to support or shore the roof of a coal mine. The bolts have a square-shaped head on one end thereof and a stem or shank 6 feet or more in length which is inserted in a hole drilled in the coal mine roof. An annular plate or disc is slidably positioned on the shank of the bolt next to the head and the shank is retained in the hole in the roof by an expansible mechanical means carried by the bolt by a resin-type adhesive or grout, or by a resin-assisted, expansible mechanical means.

Most of such overhead support bolts are placed or positioned in the roof in accordance with a roof support control plan which must be originated by each coal mine operator in accordance with applicable governmental safety laws and regulations and subsequently approved by the government. The bolts must be placed a certain distance apart or in a pattern to adequately support the roof, and the distance between the bolts will vary depending on the condition of the roof and the strata above.

Bolts in an approved roof control plan or pattern cannot be used to support heavy loads or impact loads unless the bolts are held in the roof by resin-type adhesives or grout and are fully grouted if the bolts are mechanically anchored in the roof or are resin-assisted, only light loads such as communication cables or the like can be carried by or suspended from the heads of the bolts. If such light loads are carried by the bolts, some of the plates under the heads of the bolts are structured to include a tang or other configurations which can be used to attach such loads to the plate.

If it is desired to support light or moderate loads from the roof, roof anchors or small bolts other than roof support bolts can be employed, the most common being a hollow, cylindrical mechanical-type anchor 8 inches in length with a longitudinally-split periphery and which includes a frustoconical shaped nut on the upper inner end thereof adapted to receive a long threaded stud. When the stud is turned in the nut, the upper end of the cylindrical anchor is expanded in the hole in the roof in which it is inserted and the anchor is rigidly held in the hole. A load support is then threadedly attached to the free or opposite end of the stud for supporting a load from the roof. This type of anchor requires the drilling of a separate hole in the roof for each anchor and the drilling of the hole and the installation of the anchor is time consuming and expensive.

U.S. Pat. No. 4,958,796 was issued to the applicant on Sep. 25, 1990. The references cited against this patent showed several overhead supports for carrying a load including overhead supports for suspending or hanging a load from a coal mine roof. These references all used ceiling anchors or small bolts to support light or moderate loads instead of suspending or hanging a load from the head of a coal mine roof bolt. The couplings disclosed by the references also differed substantially in concept and structure from that utilized in the applicant's device.

For supporting heavy and moderate loads from the roof, it has been common practice for years to insert a separate roof bolt in the roof outside of the addition to the bolts in a roof control pattern. Such a separate roof bolt with any means for holding the bolt in a hole in the roof can be employed for supporting heavy or moderate loads, provided the condition of the roof will safely support the bolt and the load carried thereby.

It has also been common practice for years in the case of such bolts to use a length of angle iron with a separate roof bolt to suspend a load from the head of the bolt. The length of angle iron is provided with a hole in each strip or side thereof. One hole receives the shank of the roof bolt and the side of the angle iron having that hole therein is held against the roof by the head of the bolt when installed and functions as the circular plate normally carried under the head of the bolt. The hole in the other side of the angle iron can then be used to hold or receive a chain or any other type of load support whereby a heavy or moderate load can be suspended from the head of the roof bolt. Using a separate bolt and the angle iron can be successfully employed to support such loads but this type or arrangement obviously requires the drilling of a separate hole in the roof and the installation of the bolt and angle iron, all of which again is very expensive and time consuming.

The use of a separate roof bolt for suspending a load from the roof could be eliminated in many instances if the existing roof bolts or the bolts that form part of a roof control plan and are fully resin grouted could be utilized to carry suspended or hanging loads. The present invention provides a device for so utilizing such roof bolts whereby a load can be suspended or hung from the head of a roof bolt forming part of an approved roof control plan.

U.S. Pat. No. 4,958,796 issued to the applicant on Sep. 25, 1990, also covers such a device although it differs substantially in structure from the coupling and load support of the present invention and is specifically structured to suspend or hang very heavy loads from the head of a coal mine roof bolt, loads ranging from 1000 lbs. to several tons.

The patented device includes a coupling which is made of heavy tool steel, which is circular in cross section and which has a much greater wall thickness so that it can be employed to carry the heavy loads. The patented device is rigidly attached to the head of a roof bolt by a plurality of bolts larger in size than those used in the applicant's device and are more expensive than the bolts utilized in the applicant's device, The patented device is vastly more expensive because of the use of tool steel and fabricating the coupling thereof is much more difficult and expensive, especially in tapping the threaded apertures that carry the bolts for attaching the coupling to the head of a roof bolt.

The coupling employed in the instant invention differs radically in structure from the patented device, is much lighter in weight, utilizes cheaper materials and components, can be inexpensively fabricated, and can be sold at a fraction of the cost of the patented device. The coupling of the present invention was designed and constructed to support light and moderate loads or loads up to 800 lbs., although the coupling can support, if need be, far greater loads from the head of a roof bolt, and under such greater loads the coupling will not slip or fall off of the head of the roof bolt, as will be discussed more in detail hereinafter.

The coupling of the present invention is comprised of a thin-walled, hollow, open-ended, substantially square-shaped housing which is dimensioned so that the open upper end thereof can be slidably received on the substantially square-shaped head of a roof bolt. The housing is rigidly connected to the head of the roof bolt by one or more bolts, preferably four, and the lower portion of the housing carries a threaded nut or the like, or is reduced in dimensions and is internally threaded, whereby a threaded stud can be employed to connect a load support to the housing so that a load can be suspended or hung from the head of the roof bolt.

PRIOR ART

The U.S. Patents listed below are considered by the applicant to constitute the most pertinent prior art relating to the present invention.

| | |
|---|---|
| Marquardt | 680,609 |
| Gonia | 1,098,250 |
| Rohmer | 1,120,411 |
| Hamilton | 1,937,654 |
| Truax | 2,851,239 |
| Curry et al. | 2,854,824 |
| Dempsey | 2,862,368 |
| Genter | 2,891,752 |
| Daugherty | 2,923,508 |
| Brogan | 2,942,819 |
| Carner | 3,170,664 |
| Foltz | 3,436,047 |
| Jenkins | 3,506,227 |
| Babb | 3,559,910 |
| Gillstrap | 3,785,598 |
| Calhoun | 4,255,070 |
| McDonald | 4,240,602 |
| Graybeal et al. | 4,293,243 |
| Westlake et al. | 4,334,803 |
| De Bruine et al. | 4,638,965 |
| Bernosky | 4,958,796 |

SUMMARY OF THE INVENTION

The coupling and load support of the present invention includes a coupling which takes the form of a thin wailed, hollow, open-ended, substantially square-shaped housing which has an upper end wall and a tower end wall and which is internally dimensioned to be slidably received on the substantially square-shaped head of a coal mine roof bolt. The housing carries one or more bolts in one or more threaded apertures in the sides of the housing, preferably four bolts or one bolt in each threaded aperture in each side of the housing. The bolts when turned inwardly of the housing rigidly connect the housing to the head of the roof bolt.

The apertures in the sides of the housing are positioned in each side of the housing above the approximate geometric center thereof and the centerline of each threaded aperture is positioned in each side of the housing a preselected distance from the upper end wall of the housing.

The threaded bolts carried in the threaded apertures have a head on one end to accommodate a wrench or the like and on the opposite end terminate in an annular or circumferential bevel. The end wall of each opposite end is concavely-cupped within the annular bevel whereby there is formed on the end of each bolt an annular ring or bead. When each bolt is turned inwardly of the housing into rigid engagement with a side of the head of the roof bolt, the annular ring on the end of each bolt penetrates or cuts into the surface of each side of the head of the roof bolt and thereby rigidly secures each bolt to each side of the head of the roof bolt to prevent the housing and the bolts from slipping off of the head of the roof bolt under load.

The lower or bottom portion of each housing carries a threaded nut or the like or is reduced in dimensions and is internally threaded whereby the housing can be connected by a threaded stud to a load support. With the housing connected to the head of the bolt and a load support connected to the bottom portion of the housing, a load can then be applied to the load support and the load can thereby be suspended from the head of the roof bolt.

Accordingly, one object of the present invention is to provide a coupling and load support wherein the coupling is light in weight.

Another object of the invention is to provide a coupling and load support wherein the coupling includes a thin-wailed, hollow, open-ended, substantially square-shaped housing or receptacle.

Another object of the invention is to provide a coupling and load support wherein the coupling can be fabricated from relatively inexpensive materials and components.

Another object of the invention is to provide a coupling and load support wherein the coupling is rigidly secured to the head of a coal mine roof bolt by one or more bolts having an annular ring or bead on the end of each bolt which penetrates or cuts into each side of the head of the roof bolt to rigidly secure the bolts to the head of the roof bolt.

Another object of the invention is to provide a coupling and load support wherein the coupling takes the form of a hollow, thin-wailed, substantially square-shaped housing having an upper end wall and a lower end wall and having a threaded aperture in one or more of the sides thereof with said threaded apertures being positioned in each side of said housing above the approximate geometric center thereof and with the centerline of each aperture being located a preselected distance below the upper end wall of said housing.

Another object of the invention is to provide a coupling and load support for suspending a load from the head of a coal mine roof bolt included in an approved roof support control plan.

Other objects and advantages of the invention will become readily apparent from the following description taken in connection with the accompanying drawings wherein, FIG. 1 is a perspective view of the coupling of the present invention wherein the coupling includes four bolts for securing the coupling to the head of a coal mine roof bolt;

FIG. 1a is a is a perspective view of a coupling identical in structure to the coupling shown in FIG. 1 with the exception that the coupling includes two bolts rather than four for securing the coupling to the head of a roof bolt;

FIG. 2 is an exploded perspective view of the coupling and a load support wherein the load support takes the form of an eye nut, with the coupling being shown partly inside elevation and partly in section, and with FIG. 2 illustrating the best mode of the construction and operation of the components on one preferred embodiment of the invention;

FIG. 3 is an illustration of one environmental application of the coupling and load support shown in FIG. 2 wherein a plurality of the couplings and load supports are employed to support a large pipe used for transporting water;

FIG. 4 illustrates another environmental application of the invention wherein the load support takes the form of a trolley wire hanger adapted to carry a trolley wire;

FIGS. 5, 5a, and 6 show another environmental application of the invention wherein the load support takes the form of a U-shaped cable hanger having reversely bent ends which are adapted to support or cradle a taut cable which in turn is used to support by wire clips a large high voltage power cable;

FIGS. 7 and 8 show another environmental application of the invention wherein the load support takes the form of a combination trolley wire hanger and power cable hanger;

FIG. 9 shows another embodiment of the housing disclosed in FIG. 1 wherein the housing is of a unitary construction and has a hollow, open-ended, substantially square-shaped upper portion, an intermediate portion and a lower portion of reduced dimensions which is internally threaded to receive a threaded stud. The housing includes four bolts for attaching the upper portion to the head of a roof bolt;

FIG. 9a shows another embodiment of the housing shown in FIG. 9 wherein the housing in FIG. 9a is identical in construction to the housing shown in FIG. 9 with the exception that it includes two bolts instead of four for attaching the upper portion of the housing to the head of a roof bolt;

FIG. 10 is a side elevation partly in section of one of the concavely-cupped bolts that are use to rigidly attach the coupling to the head of a roof bolt with the concavely-cupped end of the bolt opposite the head shown in section and the annular bevel on the end of the bolt shown in side elevation;

FIG. 10a is an end elevation of the bolt shown in FIG. 10 which clearly illustrates the annular bevel on the end of each bolt, the concavely-cupped end of the bolt within the bevel, and the annular ring or lip thereby formed on the end of the bolt;

FIG. 11 shows a side elevation of the bolt shown in FIG. 10 wherein the bolt carries a plastic plug in a hole in the threads of the bolt positioned at a preselected distance from the end of the bolt; and FIG. 12 is a side elevation of one of the spring-like clips shown in FIG. 6 hanging from the taut cable and being used to support a power cable, the clip in FIG. 12 being shown in the open position and not supporting a load.

DESCRIPTION OF THE PREFERRED EMBODIMENTS OF THE INVENTION

Referring now to the drawings wherein like reference numerals refer to like parts throughout, FIGS. 1 and 2 show one preferred embodiment of the coupling and load support for suspending a load from the head of a roof bolt. FIGS. 1 and 2 show a coupling generally designated by the reference numeral 10 which includes a thin-walled, hollow, open-ended, substantially square-shaped housing or receptacle 12 having four sides 14, 14, 14, 14 and terminating in an upper end wall 16 arid a lower end wall 18.

Each side of the housing has a threaded aperture 20 therein and each threaded aperture carries a threaded bolt 22, the housing in FIGS. 1 and 2 having four threaded apertures 20, 20, 20, 20 which carry four threaded bolts 22, 22, 22, 22. The open upper end of the housing 12 is internally dimensioned to be slidably received on the substantially square-shaped head 24 of a roof bolt generally designated by the reference numeral 26. The head of the bolt has four sides 28, 28, 28, 28, only one of which is shown in FIG. 2.

The four threaded apertures 20, 20, 20, 20 for receiving the four threaded bolts 22, 22, 22, 22 are located or positioned in each side 14 of the housing 12 at a preselected distance above the approximate geometric center of each side of the housing. So positioning the bolts above the geometric center of each side of the housing 12 positions the bolts so that they will engage the sides 28 of the head 24 of the roof bolt above the geometric center of each side 28 of the head of the roof bolt. By engaging the head of the roof bolt above the geometric center of each side, the four bolts 22, 22, 22, 22 will have to move a greater distance downwardly on the head of the roof bolt before the four bolts will slip or be pulled off the head of the roof bolt under load, as will be discussed in detail hereinafter.

The centerline of each threaded aperture 20 is located a preselected distance from the upper end wall 16 of the housing 12. This preselected distance will be determined by the material of which the housing is made and the size of the bolts 22, as will also be discussed in more detail hereinafter. The outer periphery of each threaded aperture 20 is also positioned a preselected distance from the upper end wall 16 of each side of the housing and this preselected distance is critical and must not be less than a certain measurement in order to prevent the housing 12 from rupturing around the threaded apertures under load. Again, this critical dimension is determined by the material of which the housing is made and the size of the bolts 22.

The bottom or lower portion of the housing 12 carries a threaded means therein for connecting the housing to a load support. The threaded means in this instance takes the form of a nut 30 which is internally threaded at 32 to receive a threaded stud 38 which is utilized to connect the housing 12 to an eye nut 36. The nut 30 is rigidly secured to the bottom portion of the housing by means of a weld 34. The weld 34 rigidly connects the outer periphery of the nut 30 to the bottom end wall 18 of the housing and to the inner periphery of the lower portion of the housing. The threaded stud 38 is received within a threaded passage 40 in the eye nut. With the lower portion of the stud 38 received within the threaded passage 40 in the eye nut and with the upper portion of the stud received within the nut 30 in the bottom of the housing, the stud 38 provides a means for rigidly connecting the housing and eye nut.

FIG. 1 a shows a slightly different embodiment of the coupling as shown in FIG. 1 wherein the only difference between the couplings is that the coupling 12 in FIG. 1 a includes two bolts 22, 22 instead of four bolts as shown in FIG. 1. Tests have shown that the housing 12 can be utilized when it includes four bolts and two bolts but can also be used when it employs one bolt and three bolts. These tests have shown that the housing 12 will carry a greater load and will slip off the head of a roof bolt at a greater load when a greater number of bolts 22 are employed. The results of such tests will also be discussed more in detail hereinafter. The use of four bolts is considered to be the best approach inasmuch as a greater load can be carried which provides a greater safety factor.

FIG. 3 shows one environmental application of the coupling and load support wherein a plurality of couplings and load supports are utilized to support a heavy load which takes the form of a large pipe 44 for transporting water. The couplings and load supports are identical to the coupling and load support shown in FIG. 2 and are generally designated by the reference numeral 42. The load support again takes the form of an eye nut 36. The eye nut in each instance is adapted to carry a cable 46 having a loop 48 on one end thereof and a hook 50 on the opposite end thereof. The Nook 50 is connected to another loop 52 on the opposite end of the cable, The two cables 46 thus support the pipe 44 and in effect suspend or hang the pipe from the head of a plurality of roof bolts (not shown) in addition to a pipe for transporting water, the couplings, eye-nuts and roof bolts could also be utilized to carry air pipes, power cables attached to and trailing machines, and communications cables.

FIG. 4 shows another environmental application of the invention wherein the load support takes the form of a trolley wire hanger generally designated by the reference numeral 54. The hanger 54 includes two substantially identical halves 56 (only one shown) which are held together by a bolt 58 carrying a nut 60. The hanger 54 is structured to receive a bead 64 on the upper portion of a trolley wire 62. When the nut 60 is tightened on the bolt 58, the two halves 56 of the hanger are rigidly secured to the bead 64 of the trolley wire.

The hanger 54 includes an upstanding tang 66 which is internally threaded to receive the bottom portion of a threaded stud. The hanger 54 is connected to the housing 12 through the medium of an electrical insulator 70. The insulator 70 has a threaded aperture 68 in the bottom or lower end thereof which is adapted to receive the upper portion of the threaded stud carried in the tang 66 of the hanger 54. The insulator 70 includes another threaded passage 72 in the upper end thereof which is adapted to receive the lower end of threaded stud 38 which is employed to connect the insulator 70 to the threaded nut in the bottom portion of the housing 12.

FIGS. 5, 5a, and 6 show another environmental application wherein the load support takes the form of a U-shaped cable hanger generally designated by the reference numeral 72. The cable hanger is referred to in coal mine parlance as a "Sister Hook." The U-shaped hanger includes reversely bent ends 74 (only one shown) which are adapted to support or cradle a taut steel cable 80, commonly refereed to as a "messenger cable." The U-shaped hanger 72 includes a threaded passage 76 therein for receiving the lower portion of a threaded stud 38 (not shown). The upper portion of the threaded stud is received in the threaded nut carried in the bottom portion of tile housing 12. The threaded stud thus provides a means for rigidly connecting the U-shaped hanger to the housing.

FIG. 6 shows two of the housings and load supports being utilized to support a 7200 volt power cable 88. The cable 88 includes three phase wires or conductors, two ground wires, and a pilot wire (no reference numerals) and the conductors and wires are sheathed with an insulating material 90. Spring-like wire clips or hangers 82 with reversely bent ends 84 are carried by the taut cable 80 and each hanger 82 is covered throughout most of its length by an insulating material 86. The spring-like clips 82 are thus suspended from taut cable 80 and support power cable 88 which is thereby suspended or hung from the head of a roof bolt.

FIGS. 7 and 8 show another environmental application of the coupling and load support wherein the load support takes the form of a combination trolley wire hanger and power cable hanger 92. The hanger 92 is adapted to carry or support a trolley wire 102 and a power cable 108 which in this instance is comprised of a 500,000 mil DC voltage cable 108. The hanger 92 includes a frame member 94 which carries a clamp 96 structured to rigidly connect the clamp to a bead 100 on the top of trolley wire 102. The clamp 96 is connected to the frame member 94 by means of a bolt 106. The frame member 94 also carries another clamp 104 for securing the DC power cable 108 to the frame member 94. The clamp 104 is rigidly connected to the frame member 94 by a bolt 106.

The upper portion of the frame member has a threaded aperture 110 therein adapted to receive the lower portion of a threaded stud 112. The upper portion of the threaded stud 112 is adapted to be received in a threaded aperture 114 in the bottom portion of an electrical insulator 116 positioned between the frame member 94 and the housing 12 of the coupling. The insulator 116 has another threaded aperture 118 therein which receives the lower portion of another threaded stud 38 (not shown). The upper portion of stud 38 is received in the threaded nut in the bottom portion of the housing 12. The two threaded studs thus rigidly connect the frame member 94 and the insulator 116 to the housing 12 whereby the trolley wire 102 and the power cable 108 can be suspended or hung from the head of a roof bolt.

FIG. 9 shows another embodiment of the coupling shown in FIGS. 1 and 2 wherein the coupling 120 takes the form of a unitary housing 122 the upper portion of which is thin-walled, hollow, open-ended, and substantially square-shaped having four sides 124, 124, 124, 124. The upper portion of the unitary housing is connected to an intermediate portion 128 which in turn is connected to a lower portion 130 of reduced dimensions which is internally threaded at 132. The lower portion 130 thus takes the form of a tang on the lower end of the housing which is internally threaded and is thus adapted to receive a threaded stud for connecting a load support to the housing.

Each side of the housing has a threaded aperture therein which is adapted to carry a threaded bolt 22 and the apertures are positioned in each side of the housing in the same position and with the same preselected distances as were employed in the embodiments of the housing shown in FIGS. 1 and 1a. The upper portion of the housing terminates in an end wall 126 and at the lower, internally threaded portion terminates in an end wall 134. The bolts employed in this embodiment of the housing are identical to the bolts employed in FIG. 1 and the unitary housing is formed from a segment of thin-walled, substantially square-shaped steel tubing by a swaging operation.

FIG. 9a shows another embodiment of the housing 120 which is identical to the embodiment shown in FIG. 9 with the exception that the housing in FIG. 9a carries two bolts 22, 22 instead of four bolts.

FIGS. 10 and 10a illustrate one of the bolts 22 for rigidly securing the coupling of FIGS. 1, 1a, 9, and 9a to the head of a coal mine roof bolt. The bolt has a head 136 on one end thereof for accommodating a wrench or the like and on the opposite end terminates in an annular or circumferential bevel 138. The end wall of the bolt is concavely-cupped at 140 within the annular bevel 138 to provide a bead or ring 142 on the end of the bolt which functions as a means for rigidly connecting the bolt to a side of a head of a roof bolt. When the bolt 22 is turned inwardly of the housing of the coupling into rigid engagement with a side of the head of a roof bolt, the ring or bead 142 will penetrate or cut into the side of the head of the roof bolt and will prevent the bolt from sliding downwardly and slipping off the head of the bolt under load, unless of course a load is applied to the coupling and bolts which is in excess of a predetermined limit or is greater than the bolts and the housing are designed and structured to support. With four bolts so structured and turned tightly into engagement with each side of the head of a roof bolt, it will be readily appreciated that the four bolts will support a heavy load before slipping or being pulled from the head of the roof bolt, such loads to be discussed in greater detail hereinafter.

FIG. 11 shows one of the bolts 22 as carrying a plastic plug 144 therein in the threads of the bolt at a preselected distance from the end of the bolt. The plastic plug 144 is carried in a radially extending hole positioned in the threads of the bolt. The plastic plug helps prevent the bolts from becoming loose in the threaded apertures in the sides of the housing when the coupling and load support are subjected to heavy vibration loads such as when the coupling and load support are used to support a trolley wire. In this particular instance, the plastic plug 144 is positioned in a hole three threads from the end of the bolt. The preselected position of the plug 144 will of course will be determined by the wall thickness of the housing in which the bolts are carried.

Some of the more important structural details and specifications relating to the coupling and load support are the following, with specific reference to the embodiment of the coupling as shown in FIGS. 1 and 2 of the drawings. The housing 12 is made of substantially square-shaped, 1020 cold-rolled steel tubing and the tubing is cut to size in making the housings. The housing has a wall thickness of 3/16 inches and the internal dimensions between the walls is 1 1/8 inches. The head of the roof bolt is substantially 1 inch square which easily permits the housing to be inserted on the head of a roof bolt with a clearance of 1/16 inches between the sides of the roof bolt and the inner periphery or inner sides of the housing. Each side of the housing 12 has an outside length or horizontal dimension of 1 1/2 inches, and each side of the housing has a width or vertical dimension of 1 1/8 inches. The overall length of the housing including the nut welded into the bottom portion thereof is 1 3/8 inches. When the housing is rigidly connected to the head of a roof bolt, the distance between the head of the roof bolt and the nut in the bottom portion of the housing is 1/8 inches. The head of the roof bolt has a length or vertical dimension of 5/8 inches.

In the embodiment of the invention shown in FIGS. 1 and 2, the bolts 22, 22, 22, 22 are square-headed, 3/8 inches in diameter, Grade 5, made of steel, and have a standard thread of 16 threads per inch. The center line of each threaded aperture for receiving each bolt 22 is located 5/16 inches below the top end wall of the housing 12. Moreover, the spacing between the outer periphery of each threaded aperture and the top end wall of the housing must not be less than STET inches. This dimension of 1/6 or greater is critical to the housing being able to support a substantial load before slipping off the head of a roof bolt. In the present instance where the housing 12 is made of 1020 steel, the 1/16 inch dimension is very critical to prevent the housing from rupturing around the threaded apertures when a load is applied to the housing. This critical dimension will of course vary depending upon the material of which the housing is made and the size of the bolts carried in the apertures in the housing, Bolts smaller or greater in diameter than the 3/8 inch bolts can be employed in connection with the housing shown in FIGS. 1 and 2 but a test of the housing established that bolts smaller or greater than 3/8 inches in diameter would not hold as great a load as the 3/8 inch bolts. The threaded nut 30 carried in the bottom of the housing 12 is threaded to receive a 5/8 inch threaded stud made of steel and carrying a standard thread.

Tension tests were conducted on the embodiments of the housing shown in FIGS. 1 and i a in an effort to determine at what maximum load the housing with the bolts turned into engagement with the head of a roof bolt would slip or pull off the head of the roof bolt. In one test, the housing 12 had four apertures therein carrying four bolts and the bolts were torqued to 30 ft. lbs. The housing slipped off the head of the roof bolt at 6,680 lbs. In another test with the housing carrying four bolts and with the bolts torqued to 20 ft. lbs., the housing slipped or was pulled of the head of the roof bolt at 4,560 lbs.

In still another test, wherein the housing carried three bolts and the bolts were torqued to 20 ft. lbs., the housing pulled or slipped of the head of the roof bolt at 5,240 lbs. In another test wherein the housing carried only two bolts (two opposed bolts) and the bolts were torqued to 20 ft. lbs., the housing pulled off the head of the roof bolt at 3,850 lbs. In yet another test, wherein the housing carried only 1 bolt and the bolt was torqued to 20 ft. lbs., the housing pulled or slipped off the head of the bolt at 2,990 lbs.

In another test, wherein the housing carried four bolts and the bolts were torqued to 35 ft. lbs., the housing pulled or slipped off the head of the roof bolt at 8,400 lbs. In another test, wherein the housing carried four bolts and the bolts were torqued at 50 ft. lbs. or more, the apertures in the housing and the threads on the bolts were damaged because of this excessive torque applied to the bolts. If the threads in the apertures in the housing are damaged, the bolts become loose in the threaded apertures and will slip or pull of the head of the bolt under load.

These tests have demonstrated that in usage the bolts should be torqued to not less than 20 ft. lbs. or not greater than 30 ft. lbs. when it is desired to use the coupling and load support to support a load of up to 800 lbs. In most instances, the housing 12 will carry four bolts and, if it will support a maximum load of 6,680 lbs. when the bolts are torqued to 30 ft. lbs. and a maximum load of 4,560 lbs. when torqued to 20 ft. lbs., there is really no need to torque the bolts in excess of 30 ft. lbs. when the housing is only going to be required to support a load of up to 800 lbs. In both situations, there is a large safety factor and very little danger that the housing will slip or pull of the head of a roof bolt. Since a test demonstrated that the four bolts in the housing could be safely torqued to 35 ft. lbs., it is best to limit the torque applied to 30 ft. lbs. and not risk any damage to the threads in the apertures in the housing. Not all torque wrenches when applied to the head of a bolt register the same torque readings, especially when the torque wrenches are of different types and are used on a production basis in a coal mine. In other words, when a given torque wrench registers 35 ft. lbs., it may in fact be registering a greater number such as 40–45 ft. lbs.

While in most instances the housing will be used with four bolts, there always exists the possibility that there might be the need to use the housing with less than four bolts. One of the tests mentioned above clearly established that a housing carrying one, two, or three bolts could be employed although the loads carried by the housing would be lighter and the safety factor would not be as great.

The bolts, the square-shaped tubing, the threaded studs and the nut carried within the bottom portion of the housing are all readily available in the commercial open market. No special production equipment is required to construct or fabricate the completed housings. The load supports connected to the housings as shown in the drawings are also readily available in the commercial open market.

While the invention has been described and illustrated in detail, it is to be clearly understood that this is intended by way of illustration and example only and is not to be taken by way of limitation, the spirit and scope of this invention being limited only by the appended claims.

What is claimed and desired to be secured by Letters Patent is:

1. A coupling and load support for suspending or hanging a load from the head of a coal mine roof bolt comprising:

a hollow, open-ended housing having a plurality of sides and having an upper portion and a lower portion with each portion terminating in an end wall, means carried in the lower portion of said housing for connecting a load support to said housing, said housing being internally dimensioned so that the open-ended upper portion thereof can be slidably received on the head of said roof bolt at least one threaded bolt carried in at least one threaded aperture in at least one side of the upper portion of said housing, said at least one threaded bolt when turned in said at least one threaded aperture inwardly of said housing being moved into rigid engagement with the head of said roof bolt to thereby rigidly secure said housing to said roof bolt, a threaded stud having an upper portion and a lower portion with the upper portion thereof threadedly received within said means carried in the lower portion of said housing, a load support threadedly carried on the lower portion of said threaded stud.

said threaded stud rigidly connecting said load support to said housing whereby a load can be carried by said load support and can thereby be suspended or hung from the head of said roof bolt, said load support taking the form of a trolley wire hanger, said hanger including a clamp for rigidly holding a trolley wire, a threaded stud carried by said hanger, and an electrical insulator threadedly connected at one end to said stud carried by said hanger, the lower portion of said threaded stud connecting the opposite end of said insulator to said means carried in the lower portion of said housing whereby said trolley wire hanger is rigidly connected to said housing.

2. A coupling and load support for suspending or hanging a load from the head of a coal mine roof bolt comprising:

a hollow, open-ended housing having a plurality of sides and having an upper portion and a lower portion with each portion terminating in an end wall, means carried in the lower portion or said housing for connecting a load support to said housing, said housing being internally dimensioned so that the open-ended upper portion thereof can be slidably received on the head of said roof bolt, at least one threaded bolt carried in at least one threaded aperture in at least one side of the upper portion of said housing;

said at least one threaded bolt when turned in said at least one threaded aperture inwardly of said housing being moved into rigid engagement with the head of said roof bolt to thereby rigidly secure said housing to said roof bolt, a threaded stud having an upper portion and a lower portion with the upper portion thereof threadedly received within said means carried in the lower portion of said housing, and a load support threadedly carried on the lower portion of said threaded stud, said threaded Stud rigidly connecting said load support to said housing whereby a load can be carried by said load support and can thereby be suspended or hung from the head of said roof bolt.

said load support taking the form of a substantially U-shaped cable hanger having a threaded passage therein for receiving the lower portion of said stud, said stud rigidly connecting said load support to said means carried in the lower portion of said housing, said U-shaped cable hanger having reversely bent ends with the reversely bent ends being adapted to carry a taut cable, said taut cable supporting a power cable suspended from said taut cable by wire clips carried by said taut cable.

3. A coupling and load support for suspending or hanging a load from the head of a coal mine roof bolt comprising:

a hollow, open-ended housing having a plurality of sides and having an upper portion and a lower portion with each portion terminating in an end wall, means carried in the lower portion of said housing for connecting a load support to said housing:

said housing being internally dimensioned so that the open-ended upper portion thereof can be slidably received on the head of said roof bolt, at least one threaded bolt carried in at least one threaded aperture in at least one side of the upper portion of said housing, said at least one threaded bolt when turned in said at least one threaded aperture inwardly of said housing being moved into rigid engagement with the head Of said roof bolt to thereby rigidly secure said housing to said roof bolt, a threaded stud having an upper portion and a lower portion with the upper portion thereof threadedly received within said means carried in the lower portion of said housing, a load support threadedly carried on the lower portion of said threaded stud, said threaded stud rigidly connecting said load support to said housing whereby a load can be carried by said load support and can thereby be suspended or hung from the head of said roof bolt, said load support taking the form of a combination trolley wire hanger and power cable hanger, said combination hanger including a frame member, a clamp secured to said frame member for rigidly connecting a trolley wire to said frame member, a second clamp for rigidly connecting a DC power cable to said frame member, and an electrical insulator having an upper end and a lower end and being connected at the lower end thereof to said frame member at the end of said frame member opposite said trolley wire, said insulator being connected at the lower end thereof to said frame member by a threaded stud carried by said insulator and said frame member, said upper end of said insulator and said means carried in said lower portion of said housing being rigidly connected by said lower portion of said threaded stud whereby said combination hanger and the load carried thereon are rigidly connected to said housing and are thereby suspended from the head of said roof bolt.

4. A coupling and load support for suspending or hanging a load from the head of a coal mine roof bolt having four sides comprising:

a thin-walled, hollow, square-shaped, open ended housing or receptacle having an upper portion and a lower portion with each portion terminating in an end wall, a threaded nut carried in the open end of said lower portion of said housing and being rigidly secured to the lower portion of said housing for connecting a load support to said housing, said housing having four sides and being internally dimensioned so that the open-ended upper portion thereof can be slidably received on the head of said roof bolt, at least one threaded bolt carried in at least one threaded aperture in at least one side of the upper portion of said housing, said at least one threaded bolt when turned in said at least one threaded aperture inwardly of said housing being moved into rigid engagement with one side of the head of said roof bolt to thereby rigidly secure said housing to the head of said roof bolt, a threaded stud having an upper portion and a lower portion with the upper portion thereof threadedly received within said threaded nut carried in the lower portion of said housing, a load support threadedly carried on the lower port ion of said threaded stud, said threaded stud rigidly connecting said load support to said housing whereby a load can be carried by said load support and can thereby be suspended or hung from the head of said roof bolt, said load support taking the form of a trolley wire hanger, said hanger including a clamp for rigidly holding a trolley wire, a threaded stud carried by said hanger, an electrical insulator threadedly connected at one end to said stud carried by said hanger, and said lower portion of said threaded stud connecting the opposite end of said insulator to said nut carried in the lower portion of said housing whereby said trolley wire hanger and the load carried thereon are rigidly connected to said housing and thereby suspended from the head of said roof bolt.

5. A coupling and load support as claimed in claim 4 wherein, said housing is made of 1020 cold rolled steel and has a wall thickness of substantially $3/16$ inches, said housing has an internal dimension between the walls of substantially $1\frac{1}{8}$ inches, each side of said housing has an outside or horizontal dimension of substantially $1\frac{1}{2}$ inches and has outside width or vertical dimension of substantially $1\frac{1}{8}$ inches, said nut secured to the lower portion of said housing is internally threaded and is internally dimensioned to receive a steel, $5/8$ inch stud carrying a standard thread, and said housing, including the nut secured thereto in the lower portion thereof, has an overall length of substantially $1\frac{3}{8}$ inches.

6. A coupling and load support as claimed in claim 5 wherein, each threaded aperture in each side of said housing is located above the approximate geometric center of each side of said housing and has a diameter of substantially $3/8$ inches threaded to receive a $3/8$ inch, steel, Grade 5, bolt with a standard thread of 16 threads per inch, the center line of each threaded aperture is located substantially $5/16$ inches below the end wall of the upper portion of said housing, the distance between the outer periphery of each threaded aperture and the end wall of the upper portion of the housing is critical and is not less than $1/16$ inches, each threaded bolt carried in each threaded aperture is $3/8$ inches in diameter, made of steel, Grade 5, with a standard thread of 16 threads per inch, each threaded bolt carried in each threaded aperture has a head on one end to accommodate a wrench and on the opposite end has an annular or circumferential bevel, and the end wall of each threaded bolt is concavely cupped within the annular bevel to provide an annular ring or lip on the end of each bolt, the annular ring on the end of each threaded bolt, when said bolt is turned inwardly of said housing into engagement with a side of the head of said roof bolt, penetrating or cutting into the surface of the side of the head of the roof bolt to thereby rigidly connect each bolt and said housing to the head of said roof bolt.

7. A coupling and load support as claimed in claim 6 wherein, each threaded bolt carried in each threaded aperture in said housing has a plastic plug carried in a substantially radially extending hole positioned in the bolt threads a preselected distance inwardly from the annular bevel on the end of the bolt, said plastic plug helping to retain each bolt in each threaded aperture in said housing so that said bolts will not become loose in said threaded apertures when said housing is subjected to vibration loads such as when carrying a trolley wire and hanger.

8. A coupling and load support for suspending or hanging a load from the head of a coal mine roof bolt having four sides comprising:

a thin-walled, hollow, square-shaped, open ended housing or receptacle having an upper portion and a lower portion with each portion terminating in an end wall, threaded nut carried in the open end of said lower portion of said housing and being rigidly secured to the lower portion of said housing for connecting a load support to said housing, said housing having four sides and being internally dimensioned so that the open-ended upper portion thereof can be slidably received on the head of said roof bolt, at least one threaded bolt carried in at least one threaded aperture in at least one side of the upper portion of said housing, said at least one threaded bolt when turned in said at least one threaded aperture inwardly of said housing being moved into rigid engagement with one side of the head of said roof bolt to thereby rigidly secure said housing to the head of said roof bolt, a threaded stud having an upper portion and a lower portion with the upper portion thereof threadedly received within said threaded nut carried in the lower portion of said housing, and a load support threadedly carried on the lower portion of said threaded stud:

said threaded stud rigidly connecting said load support to said housing whereby a load can be carried by said load supports and can thereby be suspended or hung from the head of said roof bolt, said load support taking the form of a substantially U-shaped cable hanger having a threaded passage therein for receiving the lower portion of said stud, said stud rigidly connecting said load support to said threaded nut carried in the lower portion of said housing, said U-shaped cable hanger having reversely bent ends with the reversely bent ends being adapted to carry a taut cable, said taut cable supporting a power cable suspended from said taut cable by wire clips carried by said taut cable.

9. A coupling and load support for suspending or hanging a load from the head of a coal mine roof bolt having four sides comprising:

a thin-wailed, hollow, square-shaped, open ended housing receptacle having an upper portion and a lower portion with each portion terminating in an end wall, a threaded nut carried in the open end of said lower portion of said housing and being rigidly secured to the lower portion of said housing for connecting a load support to said housing, said housing having four sides and being internally dimensioned so that the open-ended upper portion thereof can be slidably received on the head of said roof bolt, at least one threaded bolt carried in at least one threaded aperture in at least one side of the upper portion of said housing, said at least one threaded bolt when turned in said at least one threaded aperture inwardly of said housing being moved into rigid engagement with one side of the head of said roof bolt to thereby rigidly secure said housing to the head of said roof bolt, a threaded stud having an upper portion and a lower portion with the upper portion thereof threadedly received within said threaded nut carried in the lower portion of said housing, a load support threadedly carried on the lower portion of said threaded stud, said threaded stud rigidly connecting said load support to said housing whereby a load can be carried by said load support and can thereby be suspended or hung from the head of said roof bolt, said load support taking the form of a combination trolley wire hanger and power cable hanger, said combination hanger including a frame member, a clamp secured to said frame member for rigidly connecting a trolley wire to said frame member, a second clamp for rigidly connecting a DC power cable to said frame member, and an electrical insulator having an upper end and a lower end and being connected at the lower end thereof to said frame member at the end of said frame opposite said trolley wire, said insulator being connected at the lower end thereof to said frame member by a threaded stud carried by said insulator and said frame member, said upper end of said insulator and said threaded nut carried in said lower portion of said housing being rigidly connected by said lower portion of said threaded stud whereby said combination hanger and the load carried thereon are rigidly connected to said housing and are thereby suspended from the head of said roof bolt.

10. A coupling and load support for suspending or hanging a load from the head of a coal mine roof bolt having four sides comprising:

a unitary housing or receptacle having a thin-walled, hollow: substantially square-shaped open-ended upper portion and having an elongated lower portion of reduced dimensions with both portions terminating in an end wall, said lower portion being internally threaded and being connected to said upper portion by an intermediate portion, said internally threaded lower portion structured to receive a stud for connecting a load support to said housing, said upper portion of said housing having four sides and being internally dimensioned so that the open-ended upper portion thereof can be slidably received on the head of said roof bolt, at least one threaded bolt carried in at least one threaded aperture in at least one side of the upper portion of said housing, said at least one bolt when turned in said at least one threaded aperture inwardly of said housing being moved into rigid engagement with at least one side of the head of said roof bolt to thereby rigidly secure said housing to the head of said roof bolt, a threaded stud having an upper portion and a lower portion with the upper portion thereof threadedly received within said internally threaded lower portion of said housing, a load support threadedly carried on the lower portion of said threaded stud, said threaded stud rigidly Connecting said load support to said housing whereby a load can be carried by said load support and can thereby be suspended or hung from the head of said roof bolt, said load support taking the form of a trolley wire hanger, said hanger including a clamp for rigidly holding a trolley wire, a threaded stud carried by said hanger, and an electrical insulator having an upper end and a lower end with the lower end thereof being threadedly connected to said stud carried by said hanger, said threaded stud carried in said internally threaded lower portion of said housing rigidly connecting the upper end of said insulator to said lower portion of said housing and thereby suspending said load support and the load carried thereby from the head of said roof bolt.

11. A coupling and load support as claimed in claim 10 wherein, said housing in made of 1020 cold rolled steel and has a wall thickness of substantially 3/16 inches, said housing has an internal dimension between the walls of substantially 1⅛ inches, each side of said upper portion of said housing has an outside or horizontal dimension of substantially 1½ inches and has outside width or vertical dimension of substantially 1⅛ inches, and said internally threaded lower portion of said housing is threaded with a standard thread and is internally threaded to receive a steel, ⅝ inch stud carrying a standard thread.

12. A coupling and load support as claimed in claim 11 wherein, each threaded aperture in each side of the upper portion of said housing is located above the approximate geometric center of each side of the upper portion of said housing and has a diameter of substantially ⅜ inches threaded to receive a ⅜ inch, steel, Grade 5 bolt with a standard thread of 16 threads per inch, the center line of each threaded aperture is located substantially ⁵⁄₁₆ inches below the end wall of the upper portion of said housing, the distance between the outer periphery of each threaded aperture and the end wall of the upper portion of the housing is critical and is not less than ¹⁄₁₆ inches, each threaded bolt carried in each threaded aperture is substantially ⅜ inches in diameter, made of steel, Grade 5, with a standard thread of 16 threads per inch, each threaded bolt carried in each threaded aperture has a head on one end to accommodate a wrench and on the opposite end has an annular or circumferential bevel, and the end wall of each threaded bolt is concavely cupped within the annular bevel to provide an annular ring or lip on the end of each bolt, the annular ring on the end of each threaded bolt, when said bolt is turned inwardly of said housing into engagement with a side of the head of said roof bolt, penetrating or cutting into the surface of the side of the head of the roof bolt to thereby rigidly connect each bolt and said housing to the head of said roof bolt.

13. A coupling and load support as claimed in claim 12 wherein, each threaded bolt carried in each threaded aperture in said housing has a plastic plug carried in a substantially radially extending hole positioned in the bolt threads a preselected distance inwardly from the annular bevel on the end of the bolt, said plastic plug helping to retain each bolt in each threaded aperture in said housing so that said bolts will not become loose in said threaded apertures when said housing is subjected to vibration loads such as when carrying a trolley wire and hanger.

14. A coupling and load support for suspending or hanging a load from the head of a coal mine roof bolt having four sides comprising:

a unitary housing or receptacle having a thin-walled, hollow, substantially square-shaped open-ended upper portion and having an elongated lower portion of reduced dimensions with both portions terminating in an end wall, said lower portion being internally threaded and being connected to said upper portion by an intermediate portion, said internally threaded lower portion structured to receive a stud for connecting a load support to said housing, said upper portion of said housing having four sides and being internally dimensioned so that the open-ended upper portion thereof can be slidably received on the head of said roof bolt, at least one threaded bolt carried in at least one threaded aperture in at least one side of the upper portion of said housing, said at least one threaded bolt when turned in said at least one threaded aperture inwardly of said housing being moved into rigid engagement With one side of the head of said roof bolt to thereby rigidly secure said housing to the head of said roof bolt, a threaded stud having an upper portion and a lower portion with the upper portion thereof threadedly received within said internally threaded lower portion of said housing, and a load support threadedly carried on the lower portion of said threaded stud, said threaded stud rigidly connecting said load support to said housing whereby a load can be carried by said load support and can thereby be suspended or hung from the head of said roof bolt, said load support taking the form of a substantially U-shaped cable hanger having a threaded passage therein for receiving the lower portion of said stud, said stud rigidly connecting said load support to said internally threaded lower portion of said housing, said U-shaped cable hanger having reversely bent ends with the reversely bent ends being adapted to carry a taut cable, said taut cable supporting a power cable suspended from said taut cable by wire clips carried by said taut cable.

15. A coupling and load support for suspending or hanging a load from the head of a coal mine roof bolt having four sides comprising:

a unitary housing or receptacle having a thin-walled, hollow, substantially square-shaped open-ended upper portion and having an elongated lower portion of reduced dimensions with both portions terminating in an end wall, said lower portion being internally threaded and being connected to said upper portion by an intermediate portion.

said internally threaded lower portion structured to receive a stud for connecting a load support to said housing, said upper portion of said housing having four sides and being internally dimensioned so that the open-ended upper portion thereof can be slidably received on the head of said roof bolt, at least one threaded bolt carried in at least one threaded aperture in at least one side of the upper portion of said housing, said at least one bolt when turned in said at least one threaded aperture inwardly of said housing being moved into rigid engagement with one side of the head of said roof bolt to thereby rigidly secure said housing to the head of said roof bolt, a threaded stud having an upper portion and a lower portion with the upper portion thereof threadedly received within said internally threaded lower portion of said housing, and a load support threadedly carried on the lower portion of said threaded stud, said threaded stud rigidly connecting said load support to said housing whereby a load can be carried by said load support and can thereby be suspended or hung from the head of said roof bolt, said load support taking the form of a combination trolley wire hanger and power cable hanger, said combination hanger including a frame member, a clamp secured to said frame member for rigidly connecting a trolley wire to said frame member, a second clamp for rigidly connecting a DC power cable to said frame member, an electrical insulator having an upper end and a lower end and being connected at the lower end thereof to said frame member at the end of said frame member opposite said trolley wire.

said insulator being connected at the lower end thereof to said frame member by a threaded stud carried by said insulator and said frame member, said upper of said insulator and said internally threaded lower portion of said housing being rigidly connected by said lower portion of said threaded stud whereby said combination hanger and the load carried thereon are rigidly connected to said housing and are thereby suspended from the head of said roof bolt.

16. A coupling and load support for suspending or hanging a load from the head of a coal mine roof bolt having four sides comprising:

a thin-walled, hollow, square-shaped, open ended housing or receptacle having an upper portion and a lower portion with each portion terminating in an end wall, threaded means in the lower portion of said housing for connecting a load support to said housing;

said housing having four sides and being internally dimensioned so that the open-ended upper portion thereof can be slidably received on the head of said roof bolt;

at least one threaded bolt carried in at least one threaded aperture in at least one side of the upper portion of said housing, said at least one threaded bolt when turned in said at least one threaded aperture inwardly of said housing being moved into rigid engagement with one side of the head of said roof bolt to thereby rigidly secure said housing to the head of said roof bolt, a threaded stud having an upper portion and a lower portion with the upper portion thereof being threadedly received within said threaded means in the lower portion of said housing, means including a load support and an electrical insulator, said means being threadedly carried on the lower portion of said threaded stud, and a light or moderate load not exceeding a preselected limit carried by said load support, said threaded stud rigidly connecting said load support via said electrical insulator to said housing whereby said load can be carried by said support and can thereby be suspended or hung from the head of said roof bolt, said housing being made of 1020 cold rolled steel and having a wall thickness of substantially ³⁄₁₆ inches.

said housing have an internal dimension between the walls of substantially 1⅛ inches, each side of said housing having an outside or horizontal dimension of substantially 1½ inches and having an outside width or vertical dimension of substantially 1⅛ inches.

said threaded means in the lower portion of said housing being internally threaded and being internally dimensioned to receive a steel, ⅝ inch stud carrying a standard thread.

said housing, including the threaded means in the lower portion thereof, having an overall length of substantially 1⅜ inches, said at least one threaded aperture in said at least one side of said housing being located above the geometric center of said at least one side of said housing and having a diameter of substantially ⅜ inches threaded to receive a ⅜0 inch, steel, Grade 5, bolt with a standard thread of 16 threads per inch, the center line of said at least one threaded aperture being located substantially ⁵⁄₁₆ inches below the end wall of the upper portion of said housing, the distance between the outer periphery of said at least one threaded aperture and the end wall of the upper portion of the housing being critical and being not less than ¹⁄₁₆ inches, said at least one threaded bolt carried in said at least one threaded aperture being ⅜ inches in diameter, made of steel, Grade 5, with a standard thread of 16 threads per inch.

said at least one threaded bolt carried in said at least one threaded aperture having a head on one end to accommodate a wrench and on the opposite end having an annular or circumferential bevel, the end wall of said at least one threaded bolt is concavely cupped within the annular bevel to provide an annular ring or lip on the end of said at least one threaded bolt, the annular ring on the end of said at least one threaded bolt, when said bolt is turned inwardly of said housing into engagement with a side of the head of said roof bolt, penetrating or cutting into the surface of the side of the head of the roof bolt to thereby rigidly connect said at least one bolt and said housing to the head of said roof bolt.

said electrical insulator being positioned between said housing and said load support, said electrical insulator having an upper portion and a lower portion with the upper portion of said insulator being carried on the lower portion of said threaded stud received in the threaded means in the bottom portion of said housing, said lower portion of said insulator being connected to said load support by another threaded stud threadedly received in threaded passages in said insulator and said load support, said two threaded studs rigidly connecting said load support and said insulator to said housing whereby the load carried by said load support is rigidly connected to said housing and thereby suspended from the head of said roof bolt.

17. A coupling and load support as claimed in claim 16 which includes a plurality of couplings and load supports each of which is connected to the head of a coal mine roof bolt and all of which in combination support a given load carried by the plurality of load supports.

18. A coupling and load support for suspending or hanging a load from the head of a coal mine roof bolt having four sides comprising:

a unitary housing or receptacle having a thin-walled, hollow, substantially square-shaped open-ended upper portion and having an elongated lower portion of reduced dimensions with both portions terminating in an end wall, said lower portion of said housing being connected to the upper portion thereof by an intermediate portion, threaded means in the lower portion of said housing structured to receive a stud for connecting a load support to said housing, said upper portion of said housing having four sides and being internally dimensioned so that the open-ended upper portion thereof can be slidably received on the head of said roof bolt, at least one threaded bolt carried in at least one threaded aperture in at least one side of the upper portion of said housing, said at least one threaded bolt when turned in said at least one threaded aperture inwardly of said housing being moved into rigid engagement with one side of the head of said roof bolt to thereby rigidly secure said housing to the head of said roof bolt, a threaded stud having an upper portion and a lower portion with the upper portion thereof threadedly received within said threaded means in the lower portion of said housing, a load support threadedly carried on the lower portion of said threaded stud, and a light or moderate load not exceeding a preselected limit carried by said load support, said threaded stud rigidly connecting said load support to said housing whereby a load can be carried by said load support and can thereby be suspended or hung from the head of said roof bolt.

19. A coupling and load support as claimed in claim 18 wherein:

said housing is made of 1020 cold rolled steel and has a wall thickness of substantially ³⁄₁₆ inches, said upper portion of said housing has an internal dimension between the walls of substantially 1⅛ inches, each side of the upper portion of said housing has an outside or horizontal dimension of substantially 1½ inches and has an outside width or vertical dimension of substantially 1⅛ inches, and said threaded means in the lower portion of said housing is internally threaded and is internally dimensioned to receive a steel, ⅝ inch stud carrying a standard thread.

20. A coupling and load support as claimed in claim 19 wherein:

said at least one threaded aperture in said at least one side of said upper portion of said housing is located above the geometric center of said at least one side of said upper portion of said housing and has a diameter of substantially ⅜ inches threaded to received a ⅜ inch, steel, Grade 5, bolt with a standard thread of 16 threads per inch, the center line of said at least one threaded aperture is located substantially ⁵⁄₁₆ inches below the end wall of the upper portion of said housing, the distance between the outer periphery of said at least one threaded aperture and the end wall of the upper portion of the housing is critical and is not less than ¹⁄₁₆ inches, said at least one threaded bolt carried in at least said one threaded aperture is ⅜ inches in diameter, made of steel, Grade 5, with a standard thread of 16 threads per inch, said at least one threaded bolt carried in at least said one threaded aperture has a head on one end to accommodate a wrench and on the opposite end has an annular or circumferential bevel, and the end wall of said at least one threaded bolt is concavely cupped within the annular bevel to provide an annular ring or lip on the end of said at least one threaded bolt, the annular ring on the end of said at least one threaded bolt, when said bolt is turned inwardly of said housing into engagement with a side of the head of said roof bolt, penetrating or cutting into the surface of the side of the head of the roof bolt to thereby rigidly connect said at least one bolt and said housing to the head of said roof bolt.

21. A coupling and load support as claimed in claim 20 wherein:

an electrical insulator is positioned between said housing and said load support, said electrical insulator having an upper portion and a lower portion with the upper portion of said insulator being carried on the lower portion of said threaded stud received in the threaded means in the bottom portion of said housing, said lower portion of said insulator being connected to said load support by another threaded stud threadedly received in threaded passages in said insulator and said load support, said two threaded studs rigidly connecting said load support and said insulator to said housing whereby the load carried by said load support is rigidly connected to said housing and thereby suspended from the head of said roof bolt.

22. A coupling and load support as claimed in claim 21 which includes a plurality of couplings and load supports each of which is rigidly connected to the head of a coal mine roof bolt and all of which in combination support a given load carried by the plurality of load supports.

* * * * *